(12) United States Patent
Jekel et al.

(10) Patent No.: US 9,227,480 B2
(45) Date of Patent: Jan. 5, 2016

(54) METHOD FOR PRODUCING A CHASSIS COMPONENT

(75) Inventors: Wolfgang Jekel, Hüde (DE); Frank Nachbar, Osnabrück (DE); Hauke Frenzel, Markdorf (DE); Ignacio Lobo Casanova, Friedrichshafen (DE); Andreas Temmen, Osnabrück (DE); Christian Stelter, Sulingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 300 days.

(21) Appl. No.: 13/881,034

(22) PCT Filed: Sep. 27, 2011

(86) PCT No.: PCT/EP2011/066703
§ 371 (c)(1),
(2), (4) Date: May 9, 2013

(87) PCT Pub. No.: WO2012/055657
PCT Pub. Date: May 3, 2012

(65) Prior Publication Data
US 2013/0219720 A1    Aug. 29, 2013

(30) Foreign Application Priority Data

Oct. 28, 2010 (DE) .......................... 10 2010 043 040

(51) Int. Cl.
*B60G 7/00* (2006.01)
*F16C 11/06* (2006.01)
*B60G 21/00* (2006.01)

(52) U.S. Cl.
CPC ................ *B60G 21/00* (2013.01); *B60G 7/005* (2013.01); *B60G 2204/416* (2013.01); *B60G 2206/8201* (2013.01); *F16C 11/0685* (2013.01); *Y10T 29/49622* (2015.01)

(58) Field of Classification Search
CPC .......... B60G 21/00; B60G 7/005; B60G 7/00; B60G 7/001; B60G 2206/8201; B60G 2204/416; Y10T 29/49622; B29C 45/14754; F16C 11/06; F16C 11/0628; F16C 11/0661; F16C 11/0685; F16C 11/069; F16C 11/0695; F16C 11/10; F16C 11/106
See application file for complete search history.

(56) References Cited

U.S. PATENT DOCUMENTS 3,574,363 A * 4/1971 Stephenson ................... 403/127
7,293,787 B2   11/2007 Nunez et al.
(Continued)

FOREIGN PATENT DOCUMENTS

| CA | 2 703 633 A1 | 5/2009 |
|---|---|---|
| CN | 1350903 A | 5/2002 |

(Continued)

OTHER PUBLICATIONS

Translated Japanese patent (JP 2006-307970 A) published on Sep. 11, 2006.*
(Continued)

*Primary Examiner* — David Bryant
*Assistant Examiner* — Jun Yoo
(74) *Attorney, Agent, or Firm* — Davis & Bujold, P.L.L.C.; Michael J. Bujold

(57) ABSTRACT

A method of producing a chassis component. The method including the steps of coating an outside of a structural component, coating an outside of a joint cartridge which has been preassembled as a joint, and permanently and securely connecting the structural component to the joint cartridge using a material bonding or joining process.

20 Claims, 8 Drawing Sheets

(56) References Cited

U.S. PATENT DOCUMENTS

| | | |
|---|---|---|
| 7,331,733 B2 | 2/2008 | Wolf et al. |
| 7,367,743 B2 | 5/2008 | Bernhardt et al. |
| 2004/0032107 A1* | 2/2004 | Timoney et al. ....... 280/124.128 |
| 2004/0170470 A1* | 9/2004 | Ersoy et al. ................... 403/135 |
| 2005/0200096 A1 | 9/2005 | Izquierdo Nunez et al. |
| 2007/0163100 A1* | 7/2007 | Schmidt et al. .............. 29/441.1 |
| 2009/0003972 A9* | 1/2009 | Boltshauser ...................... 413/8 |
| 2009/0129854 A1* | 5/2009 | Walter et al. .................... 403/42 |

FOREIGN PATENT DOCUMENTS

| | | | |
|---|---|---|---|
| CN | 1829866 A | | 9/2006 |
| DE | 24 54 155 A1 | | 5/1976 |
| DE | 102 31 014 A1 | | 1/2004 |
| DE | 203 11 595 U1 | | 2/2004 |
| DE | 103 44 082 A1 | | 5/2005 |
| DE | 603 04 709 T2 | | 12/2006 |
| DE | 10 2008 043 694 A1 | | 10/2009 |
| EP | 0 819 598 A2 | | 1/1998 |
| EP | 1 520 735 A1 | | 4/2005 |
| JP | 6-156032 A | | 6/1994 |
| JP | 2006-307970 A | | 11/2006 |
| JP | 2006307970 A | * | 11/2006 |

OTHER PUBLICATIONS

Chinese Office Action issued in corresponding Chinese Application No. 201180052433.6 mailed Oct. 28, 2014.
German Office Action Corresponding to DE 10 2010 043 039.0.
German Office Action Corresponding to 10 2010 043 040.4.
International Search Corresponding to PCT/EP2011/066704.
International Search Corresponding to PCT/EP2011/8066703.
Written Opinion Corresponding to PCT/EP2011/066704.
Written Opinion Corresponding to Corresponding to PCT/EP2011/8066703.

\* cited by examiner

METHOD FOR PRODUCING A CHASSIS COMPONENT

This application is a National Stage completion of PCT/EP2011/066703 filed Sep. 27, 2011, which claims priority from German patent application serial no. 10 2010 043 040.4 filed Oct. 28, 2010.

FIELD OF THE INVENTION

The invention relates to a method for producing a chassis component.

BACKGROUND OF THE INVENTION

A chassis component generally has a structural component and one or more joints securely connected thereto. Such a chassis component forms, for example, a two-point link, a three-point link or a flange joint, wherein in general, the joint is integrated into the structural component by means of force fitting, screwing or riveting. It is also possible to integrate the joint into an integral structural component housing. Such a chassis component has the following disadvantages: large construction space needs, costly, large fluctuations in the joint characteristic values, heavy weight, large number of individual parts, corrosion-prone regions (e.g. at the turning edge of the joint), large inventory of semi-finished products and greater logistics expenditure.

A wheel suspension arm for a motor vehicle, known from the document DE 603 04 709 T2, comprises a body formed from stamped sheet metal, which is connected by means of a ball joint to a wheel carrier and by means of two bearings to the vehicle chassis. The ball joint comprises a lower fitting which is inserted into a housing formed by the body and rests against the side edge of the housing via a side projection, and a cover, which is placed on the lower fitting, and which is securely connected to the surface of the body using laser welding.

With this wheel suspension arm, tolerances can add up in an unfavorable manner, when the lower fitting and the cover are installed at the body. Furthermore, the body, the lower fitting, and possibly the cover must be cleaned after assembly before a protective coating can be applied to these parts. It is also quite expensive to provide the body and the lower fitting, and possibly the cover, with different coatings.

SUMMARY OF THE INVENTION

Based on this prior art, the problem addressed by the invention is to be able to integrate the joint into the structural component in a simple manner and with greater accuracy in the case of a chassis component of the initially named type. Furthermore, it should be easy to implement different coatings of the joint and structural component.

With the method for producing a chassis component according to the invention, a structural component, which is precoated on the outside thereof, is securely permanently connected by a material bonding joining process to a joint cartridge which is precoated on the outside thereof and is preassembled to a joint.

Because the joint cartridge already preassembled to a joint is connected to the structural component, the assembly of individual parts of the joint at the structural component is omitted. As a result, a reduction of tolerances in comparison to the integration of DE 603 04 709 T2, can be attained with the integration of the joint into the structural component. Furthermore, because the joint cartridge is connected to the structural component using a material bonding joining process, the connecting procedure of the joint cartridge and the structural component is also performed with very low tolerances. As a result, higher accuracy can be attained than for example using force fitting, screwing or welding of the joint into, or onto, the structural component. Finally, the joint cartridge and the structural component are already precoated so that a different coating of the joint cartridge and the structural component is easily possibly because the joint cartridge and the structural component can be precoated independently of each other. Additionally, the handling of the components to be connected together is simplified because an installer can touch and handle the joint cartridge and the structural component without hesitation, without having to subsequently clean these components, which would otherwise be necessary before a coating process due to impurities that can be attributed to handling.

The precoated structural component is permanently securely connected to the precoated joint cartridge particularly by a material bonded connection, which is formed by the material bonding joining process.

The material bonding joining process preferably is or comprises a thermal method for the material bonded joining of materials, for instance soldering or welding, such that the material bonding joining process can also be designated as a thermal, material bonding joining process. Such a joining process is generally associated with a diffusion process so that a connection produced by this method regularly has higher strength than a purely adhesive connection such as an adhesive bonded connection. The joining process is preferably a low energy joining process or a joining process with low total energy input. Thus, it can be guaranteed that one or more heat-sensitive components disposed in the joint cartridge, such as a bearing shell composed of plastic, are not damaged by the introduction of heat associated with the joining process. The material bonding joining process particularly is or comprises beam welding, preferably laser welding. As a result, the connection of the structural component to the joint cartridge can be particularly low tolerance.

The joint cartridge is preassembled to the joint. For this purpose, a joint inner part is introduced into the joint cartridge and supported movably therein, before the structural component is connected to the joint cartridge. Thus, the joint can be manufactured with a higher accuracy, independently of the structural component. The joint inner part preferably extends out of the joint cartridge.

The joint cartridge and the structural component are precoated. For this purpose, the joint cartridge and the structural component are each provided with a coating before the structural component is connected to the joint cartridge. Preferably, these are different coatings. The joint cartridge and the structural component are advantageously coated independently of one another. The joint cartridge and structural component are advantageously precoated using different coating methods. The coatings serve particularly for protecting the joint cartridge and the structural component from environmental influences, for instance from contamination and moisture. The coatings advantageously form protective coatings. The joint cartridge is preferably precoated, that is, provided with the coating thereof before the joint cartridge is preassembled to the joint.

The structural component is preferably dip coated, particularly precoated using cathodic dip coating. For example, the structural component is precoated with a lacquer, which comprises an organic material, for example. The joint cartridge is preferably precoated using galvanic coating. The joint cartridge is coated, for example, with a zinc-iron coating.

The precoated structural component and the precoated joint cartridge are preferably pretreated for the material bonding joining process. In particular, the precoated structural component and the joint cartridge that is precoated and pre-assembled to the joint are pretreated for the material bonding joining process. Before performing the material bonding joining process, the precoating of the joint cartridge, particularly the joint cartridge preassembled to the joint, is preferably removed, at least in regions, so that a decoated region is created at the joint cartridge. The joint cartridge with the decoated region thereof is preferably connected to the structural component using the material bonding joining process. The removal of the precoating of the joint cartridge in certain regions preferably occurs using laser decoating or using another decoating method.

In particular, the precoating of the structural component is removed, at least in regions, before performing the material bonding joining process so that a decoated region is created on the structural component. The structural component is preferably connected with the decoated region thereof to the joint cartridge using the material bonding joining process. It has been shown that decoating in certain regions of the precoated joint cartridge and the precoated structural component can be implemented with lower expenditure than the material bonding joining of an uncoated joint cartridge to an uncoated structural component. This is because the uncoated components must, in general, be cleaned after joining and must be coated.

According to a further development of the invention, a joint socket is formed at the precoated structural component into which the joint cartridge, which is precoated and preassembled to a joint, is inserted. A joint socket is formed particularly at the precoated structural component into which the joint cartridge, which is precoated and preassembled to the joint, is inserted before performing the material bonding joining process. Here, the joint cartridge is preferably inserted in an axial direction into the joint socket. The removal of the precoating in certain regions of the structural component occurs preferably during the formation of the joint socket.

The formation of the joint socket preferably occurs using beam cutting, particularly using laser beam fusion cutting. Because beam cutting can be performed with very low tolerances, the joint socket can be formed and positioned with higher accuracy at the structural component.

The joint socket is preferably formed having a round, non-round, square, rectangular or polygonal perimeter contour. This perimeter contour is particularly an interior perimeter contour which surrounds the joint cartridge after the insertion thereof into the joint socket. The perimeter contour of the joint is preferably matched to the exterior perimeter contour of the joint cartridge. Thus, the joint cartridge is also preferably formed having a round, non-round, square, rectangular or polygonal perimeter contour. By forming a non-round, polygonal or polygon perimeter contour it is possible to implement a form-locking lock against rotation in addition to the material bonding connection. Additionally, by using a polygonal or polygon perimeter contour, a rotational positioning of the joint cartridge can also be provided with respect to the axial direction. A round perimeter contour, in contrast, has the advantage that the installer can insert the joint cartridge into the joint socket in any rotational position with respect to the axial direction. The connection between the joint cartridge and the structural component formed using the material bonding joining process is preferably strong enough to form a sufficient lock against rotation.

The joint socket preferably comprises a recess into which the joint cartridge is inserted. According to a further development of the invention, the joint socket comprises or forms a hole, which extends through the structural component, and into which the joint cartridge is inserted. The recess of the joint socket is particularly formed by the hole. The hole preferably extends through the structural component in the axial direction. The through hole can be formed in a simple manner using the previously named beam cutting method, and therefore, can be formed with high accuracy.

The joint cartridge preferably has a radial shoulder with which the joint cartridge rests against the structural component in the axial direction during insertion into the joint socket. Here, the shoulder lies particularly on an edge of the joint socket. The shoulder preferably has a longer extension in the radial direction than the joint socket or the hole. The placement of the shoulder on the structural component forms a positioning aid during insertion of the joint cartridge in the axial direction into the joint socket. The shoulder is particularly an exterior shoulder. The shoulder is preferably a circumferential shoulder. The joint cartridge at the outer peripheral surface thereof preferably has a circumferential collar on which the shoulder is formed. The term "radial" indicates in particular any direction running perpendicular to the axial direction.

According to a further development of the invention, the outer peripheral surface of the joint cartridge tapers, at least in regions, in the axial direction. The outer peripheral surface is conically shaped, for example, at least in regions in the axial direction. The tapering or conical shape of the outer peripheral surface of the joint cartridge is preferably used for centering the joint cartridge during insertion thereof into the joint socket. In this way, possible tolerances, for example, in the diameter of the joint socket can be compensated.

The structural component is preferably securely connected to one or more other joints. According to one embodiment of the invention, the structural component is securely connected to the one or to several other joints before the joint socket is formed in the structural component. The location at which the joint socket is formed in the structural component is preferably determined depending on the position, or positions, of the other joint, or other joints, securely connected to the structural component. The position or each of the positions are preferably formed or characterized by a kinematic point of the respective other joint. Thus, the location at which the joint socket is formed in the structural component is preferably determined depending on the kinematic point(s) of the other joint(s) securely connected to the structural component. As a result, a significant increase in accuracy can be attained compared to conventional chassis components, with which the joint socket is already formed before the connection of the structural component to one or more other joints, because the assembly of each of these other joints is associated with positioning inaccuracies. With respect to kinematics, a significant improvement is thereby possible compared the prior art. The other joint(s) preferably comprise or form rubber bearings or elastomer bearings.

The joint particularly is or forms a ball joint. The inner part of the joint preferably forms a ball pin, having a joint ball, that with the joint ball thereof is introduced into the joint cartridge, and is mounted movably therein, before the structural component is connected to the joint cartridge. Here, the ball pin with the joint ball thereof is mounted particularly movably and/or pivotably in the joint cartridge. The ball pin extends through a joint cartridge opening out of the joint cartridge. According to a further development of the invention, the ball pin is mounted slideably in a bearing shell, which is introduced into the joint cartridge and is preferably made of plastic.

The wall of the joint cartridge in the region of the joint cartridge opening is preferably reshaped, particularly bent, in the direction of the ball pin. In this case, the region of the wall to be reshaped is preferably free of the precoating of the joint cartridge, because otherwise the precoating in this region could flake off. According to an alternative, the wall of the joint cartridge in the region of the joint cartridge opening is preshaped, however also in the direction of the ball pin. According to another alternative, the joint cartridge opening can also be covered using a locking ring, which is fastened to the joint cartridge and through which the ball pin extends. However, tighter tolerances can be attained by reshaping the wall of the joint cartridge in the region of the joint cartridge opening than with a locking ring, because no additional component is required. The locking ring, or the preshaped, or reshaped region of the wall preferably covers the joint ball in the axial direction such that the ball pin is secured at the joint cartridge in the axial direction, and particularly cannot be pulled out of the cartridge. The reshaping of the wall of the joint cartridge in the region of the joint cartridge opening, or the fastening of the locking ring to the joint cartridge, preferably occurs before connecting the structural component to the joint cartridge.

According to one embodiment of the invention, the ball pin is introduced into the joint cartridge through the joint cartridge opening, particularly before the wall of the joint cartridge is reshaped in the region of the joint cartridge opening in the direction toward the ball pin, or before the locking ring is fastened to the joint cartridge.

According to another embodiment of the invention, the joint cartridge has an assembly opening, through which the ball pin is introduced into the joint cartridge, and which is located opposite the joint cartridge opening. This is particularly the case when the wall of the joint cartridge is preshaped in the region of the joint cartridge opening in the direction toward the ball pin. After introducing the ball pin into the joint cartridge, the assembly opening is preferably closed using a housing cover, particularly before the structural component is connected to the joint cartridge.

The connection region formed by the material bonding joining process, particularly the welding region formed by the welding, is preferably covered by a bellows seal. This offers the advantage that the connection region or the welding region does not need to be protected from environmental influences using a coating, such that the costs of applying such a coating can be saved. The bellows seal is preferably a bellows seal of the joint, which particularly simultaneously seals the joint cartridge opening. The ball pin preferably extends through the bellows seal, which is attached sealing particularly both at the ball pin as well as the joint cartridge and/or the structural component. The bellows seal is preferably composed of a flexible material. The bellows seal is preferably composed of an elastomer material, particularly rubber.

The structural component is preferably composed of metal. Furthermore, the joint cartridge is preferably metal.

BRIEF DESCRIPTION OF THE DRAWINGS

The invention is described below using preferred embodiments, with reference to the drawings. In the drawings.

DETAILED DESCRIPTION OF THE PREFERRED EMBODIMENTS

Figure 1:
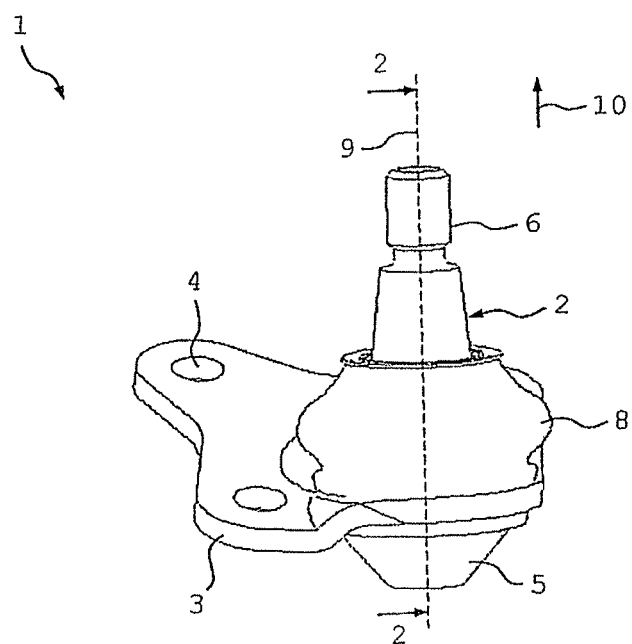
FIG. 1 a perspective view of a chassis component according to a first embodiment of the invention, FIG. 2 a longitudinal section through the chassis component along the section line 2-2 seen in FIG. 1, FIG. 3 an enlarged view of the region labeled with B in FIG. 2, FIG. 4 a perspective representation of the ball joint according to FIG. 1, FIG. 5 the ball joint according to FIG. 4 in a state inserted into a joint socket of the structural component seen in FIG. 1, FIG. 6 a partial sectional view of the ball joint inserted in the joint socket along the section line 6-6 seen in FIG. 5, FIG. 7 a perspective representation of a chassis component according to a second embodiment of the invention, FIG. 8 a top view of the structural component seen in FIG. 7 before the assembly of the ball joint, FIG. 9 a perspective representation of the ball joint according to FIG. 7, FIG. 10 the ball joint according to FIG. 9 in a state inserted into a joint socket of the structural component according to FIG. 7, FIG. 11 a partial sectional representation of the ball joint inserted in the joint socket along the section line 11-11 seen in FIG. 10, FIG. 12 a sectional view of the ball joint along the section line 11-11 seen in FIG. 10 after forming a weld seam, FIG. 13 a sectional view of the ball joint along the section line 13-13 seen in FIG. 7, FIG. 14 a partial sectional representation of the ball joint inserted in the joint socket along the section line C-C seen in FIG. 5, or along the section line 6-6 seen in FIG. 10, wherein the ball joint additionally is visible in a state only partially inserted into the joint socket, FIG. 15 a sectional view of a modified ball joint in the state only partially inserted in the joint socket, and FIG. 16 a sectional view of the ball joint according to FIG. 15 in an inserted state in the joint socket.
Figure 2:
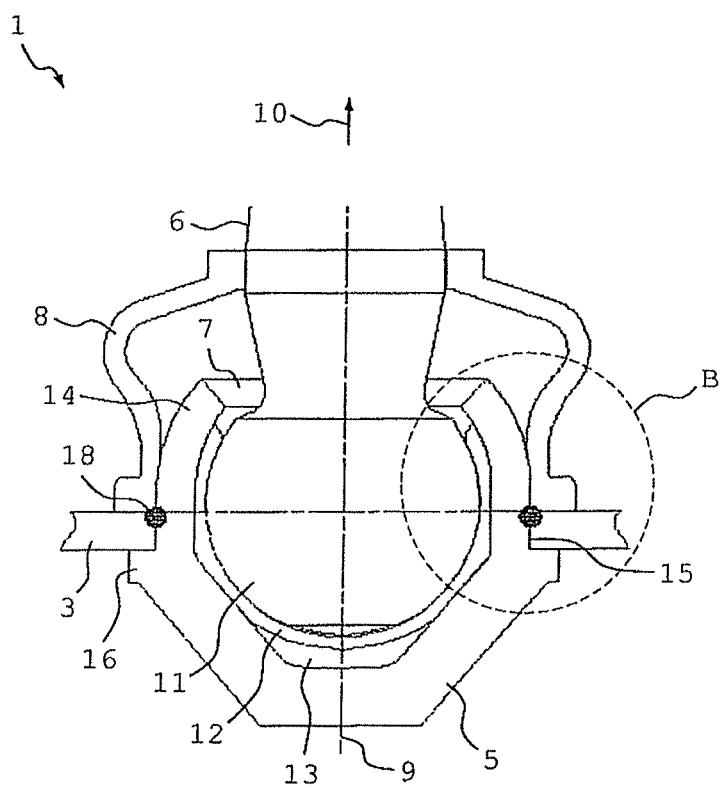
Figure 3:
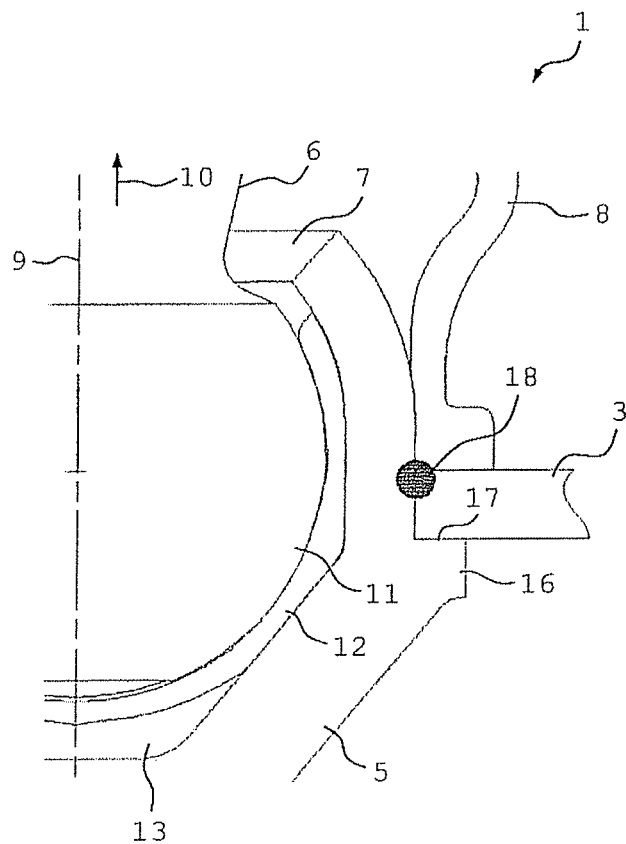
Figure 4:
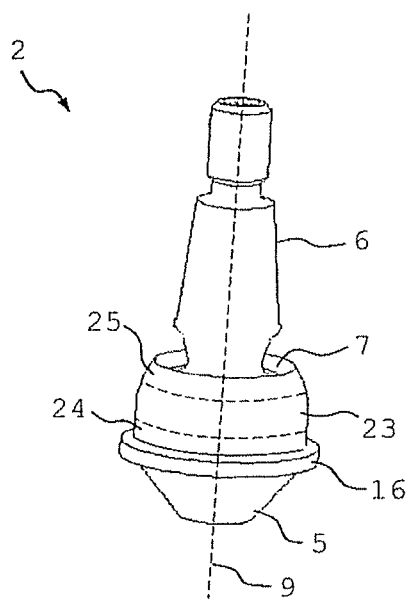

FIGS. 1 to 6 show different views and sectional views of a chassis component 1 according to a first embodiment of the invention, wherein a ball joint 2 is integrated into a structural component 3. The structural component 3 is formed as a flange which can be securely connected to another vehicle component and for which purpose the structural component 3 has several through holes 4. The ball joint 2 comprises a joint cartridge 5, serving as a joint housing, into which a ball pin 6 is mounted to rotate and pivot. The ball pin 6 extends through a joint cartridge opening 7 (see FIG. 2) out of the joint cartridge 5, wherein the joint cartridge opening 7 is sealed by means of a bellows seal 8, through which the ball pin 6 extends. The longitudinal central axis 9 of the ball joint 2 runs in an axial direction 10, wherein a sectional view of the chassis component 1 is shown in FIG. 2 along the longitudinal central axis 9.

The ball pin 6 comprises a joint ball 11, which forms an axial end of the ball pin 6 and is mounted slideably in a bearing shell 12, which is preferably made of plastic. The bearing shell 12 sits together with the joint ball 11 in an interior 13 of the joint cartridge 5, and is secured in the cartridge locked against rotation about the longitudinal central axis 9. In addition, the wall 14 of the joint cartridge 5 bounding the interior 13 is reshaped in the region of the joint cartridge opening 7 in the direction toward the ball pin 6. Thus, the wall 14 covers the bearing shell 12 in the region of the joint cartridge opening 7 and the joint ball 11 in the axial direction 10, such that the ball pin 6 and the bearing shell 12 are secured in the joint cartridge 5 in the axial direction 10. The bearing shell 12, on the side thereof facing away from the joint cartridge opening 7, rests against the wall 14.

The joint cartridge 5 sits in a joint socket 15, which is formed as a hole extending through the structural component 3 in the axial direction 10. The joint cartridge 5 comprises a peripheral, radial collar 16, which defines a radial outer shoulder 17 (see FIG. 3), by means of which the joint cartridge 5 rests against the structural component 3 in the axial direction 10. Thus, the collar 16 secures the joint cartridge 5 in the axial direction 10 at the structural component 3. Additionally, the joint cartridge 5 is welded to the structural component 3, wherein the associated welding seam is labeled with the reference number 18. The welding seam 18 is preferably formed peripherally. The welding seam can have a 360° peripheral formation, but this is not mandatory.

The bellows seal 8 surrounding the joint cartridge 5, lies with an axial end region sealing both the joint cartridge 5 and the structural component 3, and covering therefore the welding seam 18. In addition, the bellows seal 8 surrounding the ball pin 6 rests with another axial end sealing at the ball pin 6. The connection region of the ball joint 2 and the structural component 3 is therefore protected from environmental influences. The structural component 3 rests with the perimeter contour (wall of hole) 19 thereof (see FIG. 6) bounding the joint socket 15, radially at the joint cartridge 5, such that radially acting forces can be optimally transferred from the ball joint 2 to the structural component 3 and vice versa.

Figure 5:
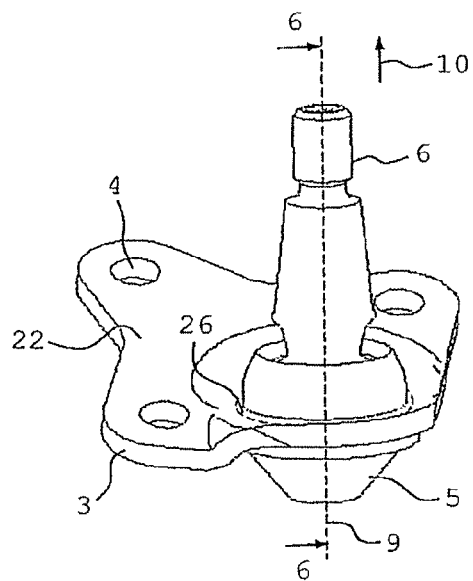
Figure 6:
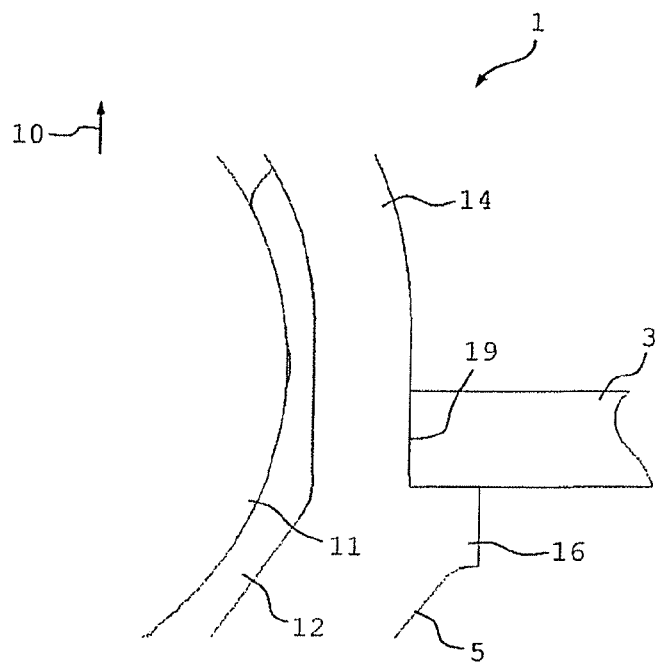
Figure 14:
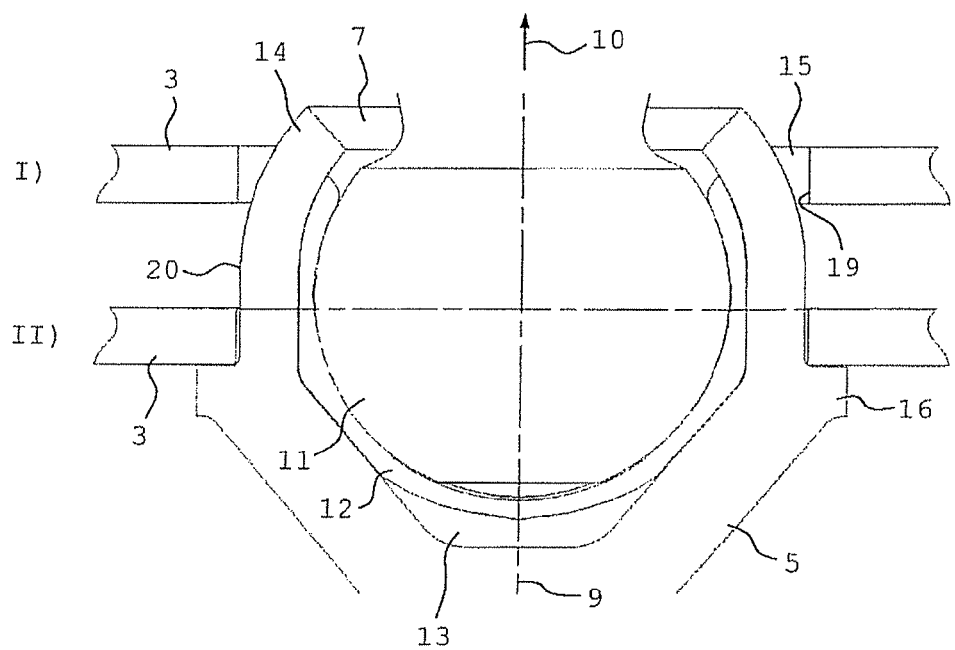
Figure 15:
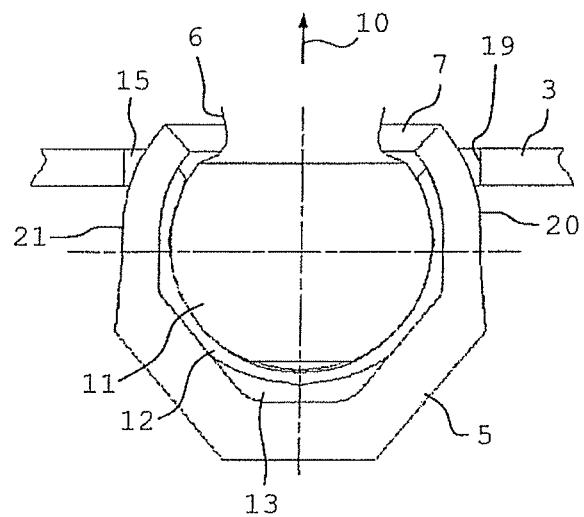
Figure 16:
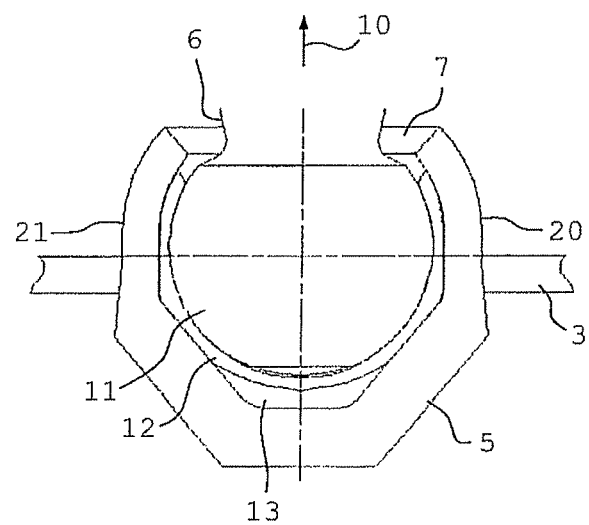

The method according to the invention for producing the chassis component 1 is described in the following. First, the structural component 3 and the ball joint 2 are produced independently of each other, which can be seen in the individual representation in FIG. 4. Only the bellows seal 8 is not yet applied to the ball joint 2. Then, the ball joint 2 is inserted, leading with the ball pin 6, in the axial direction 10 into the joint socket 15, until the collar 16 rests with the shoulder 17 in the axial direction 10 against the structural component 3. This state is shown in FIGS. 5 and 6, wherein FIG. 6 shows a partial sectional view through the ball joint 2 in the state according to FIG. 5 along the central longitudinal axis 9. During insertion of the ball joint 2 into the joint socket 15 of the structural component 3, the joint cartridge 5 is preferably centered radially by the curved region of the wall 14. This centering is shown schematically in FIG. 14, which shows a section through the ball joint 2 along the longitudinal central axis 9. Because the reshaped region of the wall 14 in the region of the joint cartridge opening 7 leads to a region of the outer peripheral surface 20 of the joint cartridge 5 tapering in the axial direction 10, and the joint cartridge 5 is introduced leading with the region of the wall 14 thereof bounding the joint cartridge opening 7 into the joint socket 15 of the structural component 3, radial centering of the joint cartridge 5 occurs due to the interplay of the perimeter contour 19 with the outer peripheral surface 20. In FIG. 14 the structural component 3 is represented twice. In a first state I, the joint cartridge 5 is positioned with its tapering region of the outer peripheral surface 20 in the joint socket 15. Due to further insertion of the joint cartridge 5 into the joint socket 15 in the axial direction 10, interplay occurs between the perimeter contour 19 and the outer peripheral surface 20 until the joint cartridge 5 is centered radially in the joint socket 15. The joint cartridge 5 is inserted into the joint socket 15 in the axial direction 10 until the shoulder 17 of the collar 16 rests against the structural component 3. This state is labeled with II. For improving the radial centering, the outer peripheral surface 20 of the joint cartridge 5 can additionally be conically shaped in regions in the axial direction 10, which is shown in FIGS. 15 and 16 that show a modified embodiment of the joint cartridge 5. According to the modified embodiment, the outer peripheral surface 20 comprises a region 21 running conically in axial direction 10, and during insertion of the joint cartridge 5 into the joint socket 15, the region is brought into contact with the perimeter contour 19. As a result, the joint cartridge 5 is secured axially to the structural component 3, so that according to the modified embodiment, the radial collar 16 having the shoulder 17 can be omitted. FIG. 15 shows a state in which the joint cartridge 5 is only partially inserted into the joint socket 15, whereas FIG. 16 shows a state in which the joint cartridge 5 is completely inserted into the joint socket 15.

After the joint cartridge 5 is completely inserted into the joint socket 15 of the structural component 3, the weld seam 18 is formed using laser beam welding and then the bellows seal 8 is attached to the ball joint 2.

Before welding the structural component 3 to the joint cartridge 5, the structural component 3 and the joint cartridge 5 are each coated on the exterior thereof with a coating 22 or respectively 23, wherein in one region 24, the coating 23 is removed again using laser decoating, before the joint cartridge 5 is welded to the structural component 3. The coating 23 is applied to the exterior of the ball pin 6 before the insertion thereof into the joint cartridge 5, wherein however one end region 25 of the joint cartridge 5 axially surrounding the joint cartridge opening 7 is not provided with the coating 23. Because the end region 25 is reshaped after insertion of the bearing shell 12 and the joint ball 11, a coating in the region 25 could flake off during the reshaping. Furthermore, the coating 22 is applied to the structural component 3 before the joint socket 15 is formed. After applying the coating 22 on the structural component 3, the joint socket 15 is formed in the structural component 3 using laser beam cutting, whereby the coating 22 is simultaneously removed in an edge region 26 of the structural component 3 surrounding the joint socket 15. The components 2 and 3, thusly prepared, can now be inserted into each other as described above, after which the decoated regions 24 and 26 are fixedly connected together using laser beam welding while forming the weld seam 18. After attaching the bellows seal 8, the weld seam 18, the still remaining parts of regions 24 and 26, and the end region 25 are protected from environmental influences by the bellows seal 8.

Figure 7:
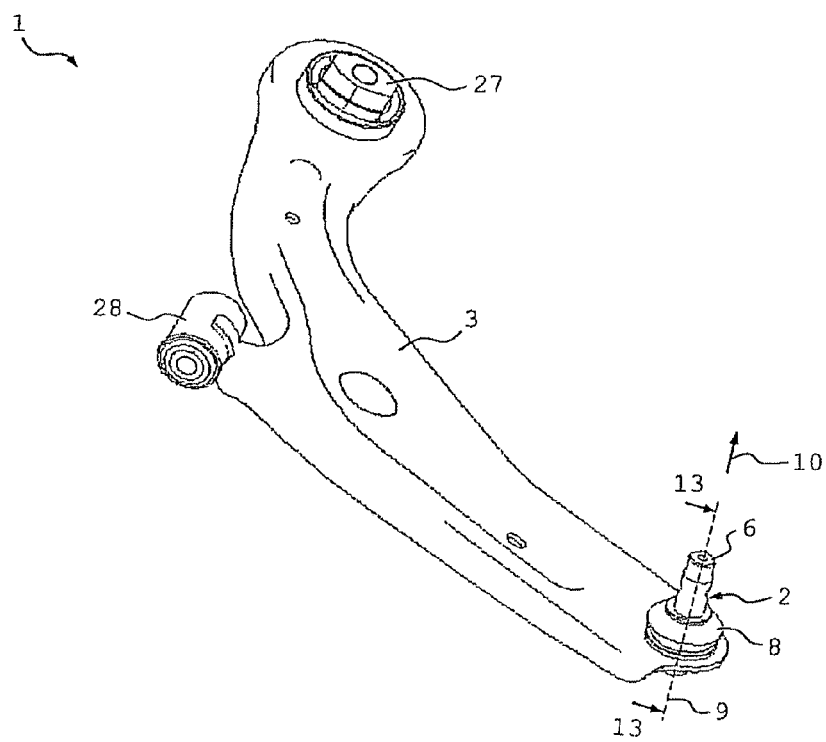

FIGS. 7 to 13 show a chassis component 1 according to a second embodiment of the invention, wherein features that are similar or identical to those of the first embodiment are labeled using the same reference characters as in the first embodiment. FIG. 7 shows a perspective representation of the chassis component 1, which is formed as a three-point link and comprises a structural component 3. A ball joint 2 and two rubber bearings 27 and 28 are securely connected to the structural component 3, wherein the bearings 27 and 28 preferably serve for linkage of the chassis component 1 to a vehicle chassis of a motor vehicle. The ball joint 2 preferably serves for linkage of the chassis component 1 to a wheel carrier.

Figure 8:
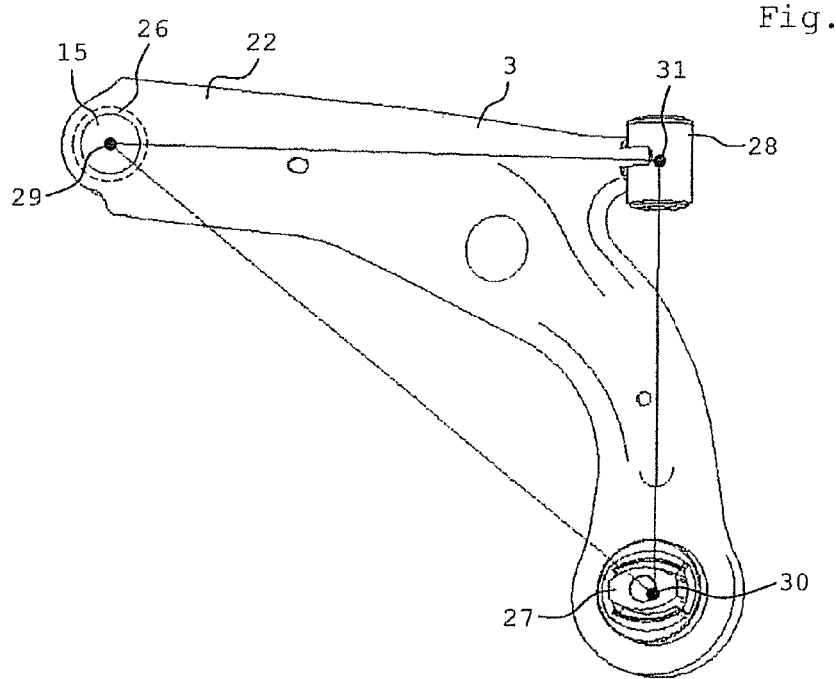
Figure 9:
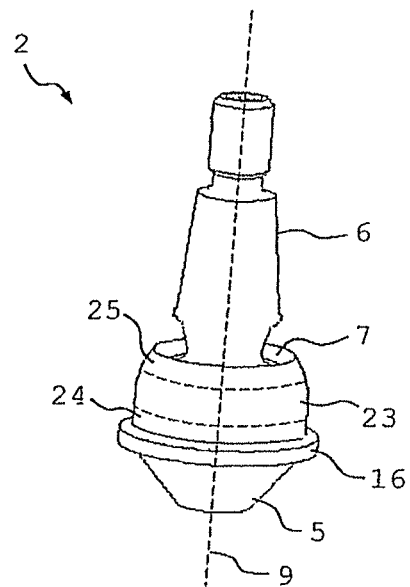
Figure 10:
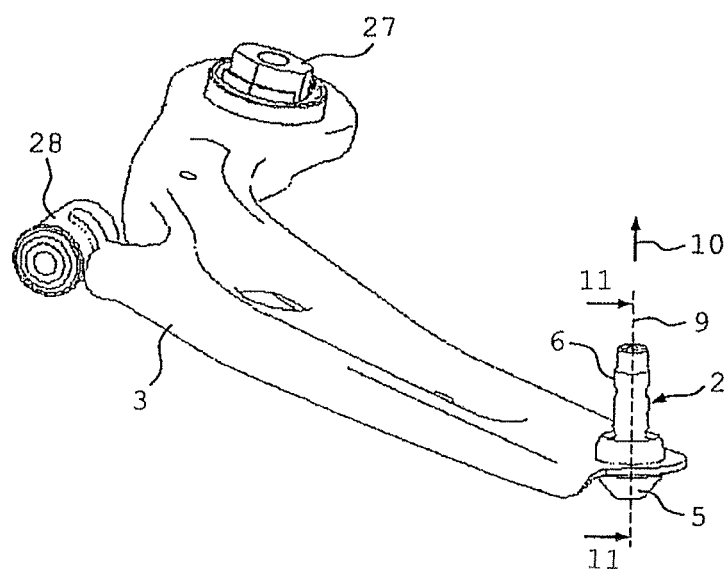
Figure 11:
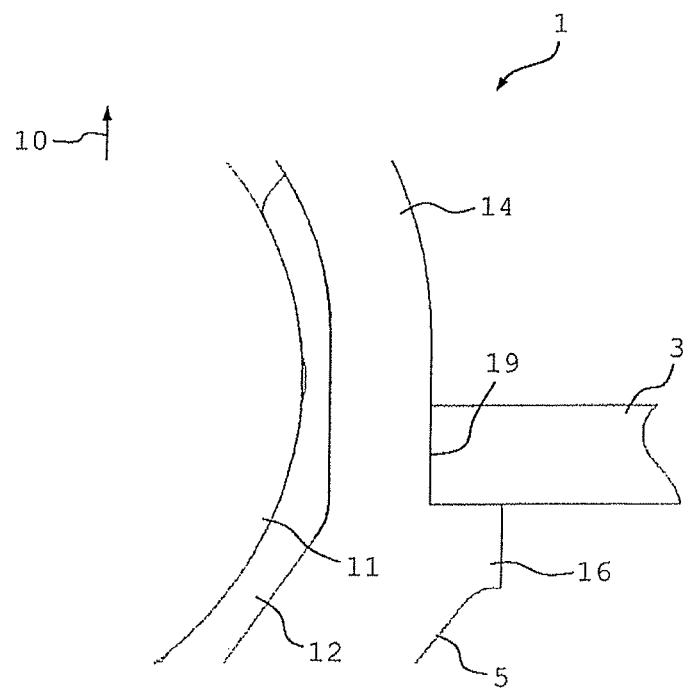
Figure 12:
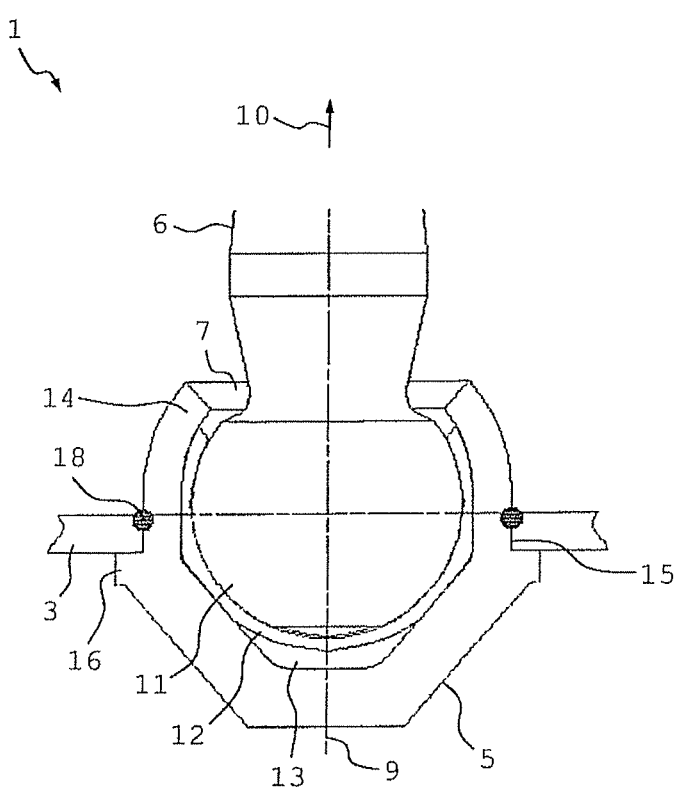
Figure 13:
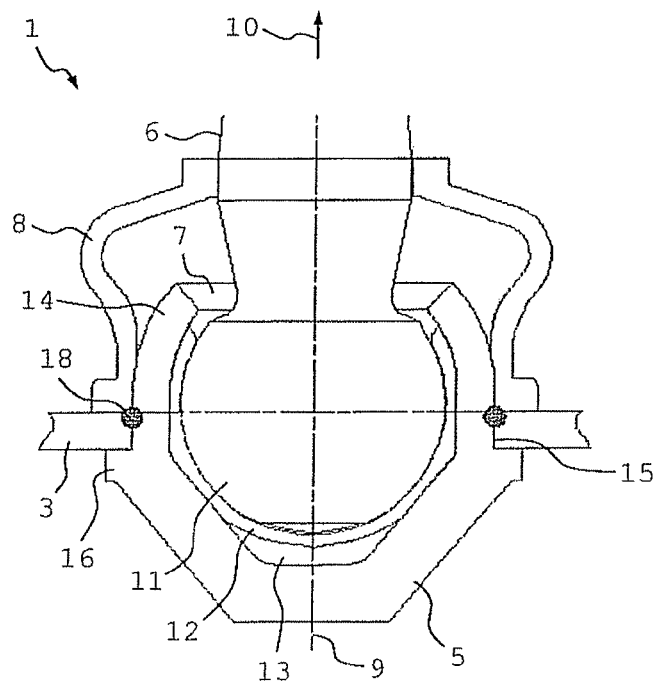

FIG. 8 shows a top view of the structural component 3, wherein the bearings 27 and 28 are already securely connected to the structural component 3. Additionally, a joint socket 15 is shown which is formed as a hole extending through the structural component 3 in axial direction 10, into which the ball joint 2 is inserted. The insertion of the ball joint 2 into the joint socket 15, and the fastening of the ball joint 2 to the structural component 3 occur in a manner analogous to the first embodiment so that in this regard reference is made to the description of the first embodiment. The joint socket 15 is formed in the structural component 3 using laser beam cutting, also in a manner analogous to the first embodiment. However, the joint socket 15 is formed only after connecting the structural component 3 to the bearings 27 and 28. Here, the location 29, at which the joint socket 15 is formed, is determined depending on the positions 30 and 31 of the rubber bearings 27 and 28 already securely connected to the structural component 3. The positions 30 and 31 of the rubber bearings 27 and 28 are represented particularly by the kinematic points thereof. Additionally, the location 29 preferably represents the location of the kinematic point of the ball joint 2 in the state securely connected to the structural component 3. The location 29 particularly characterizes the center point of the joint socket 15. After the location 29 has been determined, the joint socket 15 is cut into the structural component 3 using laser beam cutting, wherein simultaneously the surface coating 22 of the structural component 3 is removed in a region 26 surrounding the joint socket. Then, the prefabricated and partially decoated ball joint 2 according to FIG. 9 is inserted into the joint socket 15, which can be seen in FIG. 10. FIG. 11 shows a section through the ball joint 2 according to FIG. 10 along the section line 9. After insertion of the ball joint 2 into the joint socket 15 of the structural component 3, the joint cartridge 5 and the structural component 3 are welded together in the decoated regions 24 and 26 thereof, forming the welding seam 18, which can be seen in FIG. 12. Finally, a bellows seal 8 is placed on the ball joint 2, wherein FIG. 13 shows a section through the ball joint 2 according to FIG. 7 along the section line 9. For further description of the ball joint 2 and the connection thereof to the structural component 3 reference is made to the description of the first embodiment.

REFERENCE LIST 1 chassis component
2 ball joint
3 structural component
4 through hole
5 joint cartridge
6 ball pin
7 joint cartridge opening
8 bellows seal
9 longitudinal central axis of the ball joint
10 axial direction
11 ball joint of the ball pin
12 bearing shell
13 interior of the joint cartridge
14 wall of the joint cartridge
15 joint socket
16 circumferential collar of the joint cartridge
17 radial shoulder
18 weld seam
19 perimeter contour of the joint socket
20 outer peripheral surface of the joint cartridge
21 conical region of the outer peripheral surface of the joint cartridge
22 surface coating of the structural component
23 surface coating of the joint cartridge
24 decoated region of the joint cartridge
25 axial end region of the joint cartridge
26 decoated region of the structural component
27 rubber bearing
28 rubber bearing
29 location of bearing receptacle
30 position of the rubber bearing
31 position of the rubber bearing

The invention claimed is:

1. A method of producing a chassis component (1), the method comprising the steps of:
    precoating an outside surface portion (22) of a structural component (3);
    precoating an outside surface portion (23) of a joint cartridge (5) without coating an end region (25) that axially surrounding a joint cartridge opening (7);
    preassembling the precoated joint cartridge (5) with a joint ball (11) of a ball pin (6) to form a joint;
    reshaping the uncoated end region (25), after preassembling the precoated joint cartridge (5) with the joint ball (11), to retain the joint ball (11) within the joint cartridge (5); and
    permanently and securely connecting the precoated structural component (3) to the joint cartridge (5) via a material bonding joining process.

2. The method according to claim 1, further comprising the step of using a thermal process during the material bonding joining process.

3. The method according to claim 1, further comprising the step of pretreating the structural component (3) and the joint cartridge (5) prior to the material bonding joining process.

4. The method according to claim 1, further comprising the step of decoating at least one region (24) of the precoating outside surface portion (23) of the joint cartridge (5) before performing the material bonding joining process; and
    connecting the decoated region (24) of the joint cartridge (5) to the structural component (3) using the material bonding joining process.

5. The method according to claim 1, further comprising the step of decoating, via a laser, at least one region (24) of the precoating outside surface portion (23) of the joint cartridge (5);
    decoating the structural component (3), during formation of the joint socket (15) with the laser, to expose at least one uncoated region (26) of the structural component (3);
    inserting the assembled and coated joint cartridge (5) into the joint socket (15) so that the decoated region (24) of the joint cartridge (5) axially abuts against the uncoated region (26) of the structural component (3); and
    connecting at least a portion of the decoated region (24) of the joint cartridge (5) with the uncoated region (26) of the structural component (3) by the material bonding joining process.

6. The method according to claim 1, further comprising the step of decoating at least one region (26) of the precoating surface portion (22) of the structural component (3) before performing the material bonding joining process; and
    connecting the decocted region (26) of the precoating surface portion (22) of the structural component (3) to the joint cartridge (5) using the material bonding joining process.

7. The method according to claim 1, further comprising the step of forming a joint socket (15) in the structural component (3); and inserting the joint cartridge (5), in an axial direction (10), into the joint socket (15) before performing the material bonding joining process.

8. The method according to claim 1, further comprising the step of simultaneously decoating the at least one region (26) of precoating outside surface portion (22) of the structural component (3) while forming the joint socket (15).

9. The method according to claim 7, further comprising the step of the forming the joint socket (15) by at least one of laser cutting and laser beam fusion cutting.

10. The method according to claim 7, further comprising the step of forming the joint socket (15) so as to have a circular perimeter contour.

11. The method according to claim 7, further comprising the step of forming the joint socket (15) as a hole extending axially through the structural component (3).

12. The method according to claim 7, further comprising the steps of
- forming a circumferential collar (16) along an outer peripheral surface of the joint cartridge (5), with the circumferential collar (16) extending outward from the joint cartridge (5) perpendicular to an axial direction (10) of the ball pin (6); and
- inserting the joint cartridge (5) into the joint socket (15), in an axial direction (10) of the joint socket (15), until only a single radial shoulder (17) of the circumferential collar (16) of the joint cartridge (5) axially abuts against the structural component (3).

13. The method according to claim 7, further comprising the step of providing an outer peripheral surface (20) of the joint cartridge (5) with a taper which tapers, in an axial direction (10) of the joint cartridge (5), in at least one region thereof.

14. The method according to claim 1, further comprising the step of the joint (2) forming a ball joint.

15. The method according to claim 1, further comprising the step of mounting the joint ball (11) into the joint cartridge (5), before connecting the joint cartridge (5) to the structural component (3), such that the ball pin (6) with the joint ball (11) extends out of the joint cartridge through the joint cartridge opening (7).

16. The method according to claim 15, further comprising the step of reshaping a wall (14) of the joint cartridge (5), in a direction toward the ball pin (6), in the uncoated end region (25) of the joint cartridge opening (7).

17. A method of producing a chassis component, the method comprising the steps of:
- precoating an outside of a structural component (3);
- precoating an outside of a joint cartridge (5);
- forming a joint socket (15) in the structural component (3);
- inserting the joint cartridge (5), along an axial direction (10) of the joint socket (15), into the joint socket (15);
- preassembling the joint cartridge (5) with a joint ball (11) as a joint;
- permanently and securely connecting the structural component (3) to the joint cartridge (5) via a material bonding joining process, after inserting the joint cartridge 5) into the joint socket (15);
- securely connecting at least one other joint (27, 28) to the structural component (3) before forming the joint socket (15); and
- determining a location, at which the joint socket (15) is formed in the structural component (3), depending on a position (30, 31) at which the other joint (27, 28) is securely connected to the structural component (3).

18. The method according to claim 17, further comprising the step of forming the at least one other joint (27, 28) as a rubber bearing.

19. A method of producing a chassis component, the method comprising the steps of:
- precoating a surface (22) of a structural component (3);
- forming a joint socket (15) in the structural component (3) so as to expose an uncoated region (26) of the structural component (3);
- precoating an outside surface portion (23) of a joint cartridge (5), without coating an end region (25) of the joint cartridge (5);
- preassembling the joint cartridge (5) with a ball pin (6) to form a ball joint (2) by mointing the ball pin (6) in the joint cartridge (5) with the ball in (6) extending out of the joint cartridge (5) along an axial direction (10) of the joint cartridge (5);
- reshaping the uncoated end region (25) to retain the joint ball (11), in a pivotably manner with respect to the joint cartridge (5), within the precoated joint cartridge (5);
- decoating at least one region (24) of the precoated outside surface portion (23) of the joint cartridge (5);
- inserting the joint cartridge (5) into the joint socket (15) so that a circumferential collar (16) of the joint cartridge (5) axially abuts against the structural component (3), and the decoated region (24) of the joint cartridge (5) mates with the uncoated region (26) of the structural component (3);
- after inserting the joint cartridge (5) into the joint socket (15), permanently connecting the decoated region (24) of the joint cartridge (5) to the uncoated region (26) of the structural component (3) via a material bonding process; and
- covering a welding connection region (18), formed by the material bonding joining process, with a bellows seal (8) of the joint (2).

20. The method according to claim 2, further comprising the step of using laser beam welding as the thermal process.

* * * * *